United States Patent
Bai et al.

(10) Patent No.: US 12,500,015 B2
(45) Date of Patent: Dec. 16, 2025

(54) NEODYMIUM-IRON-BORON SINTERED MAGNET AND METHOD OF ANTI-CORROSION TREATMENT

(71) Applicants: TIANJIN SANHUAN LUCKY NEW MATERIAL CO., LTD., Tianjin (CN); BEIJING ZHONG KE SAN HUAN HI-TECH CO., LTD., Beijing (CN)

(72) Inventors: Xiaogang Bai, Tianjin (CN); Haihua Yu, Tianjin (CN); Guanghui Pan, Tianjin (CN); Xue Han, Tianjin (CN)

(73) Assignees: TIANJIN SANHUAN LUCKY NEW MATERIAL CO., LTD., Tianjin (CN); BEIJING ZHONG KE SAN HUAN HI-TECH CO., LTD., Beijing (CN)

(\*) Notice: Subject to any disclaimer, the term of this patent is extended or adjusted under 35 U.S.C. 154(b) by 435 days.

(21) Appl. No.: 18/162,934

(22) Filed: Feb. 1, 2023

(65) Prior Publication Data
US 2023/0178274 A1  Jun. 8, 2023

Related U.S. Application Data

(63) Continuation of application No. PCT/CN2021/117726, filed on Sep. 10, 2021.

(30) Foreign Application Priority Data

Dec. 22, 2020  (CN) .......................... 202011525256.6

(51) Int. Cl.
  *H01F 1/057* (2006.01)
  *C23C 8/12* (2006.01)
  *C23C 8/16* (2006.01)
  *H01F 41/02* (2006.01)

(52) U.S. Cl.
  CPC ............. *H01F 1/0577* (2013.01); *C23C 8/12* (2013.01); *C23C 8/16* (2013.01); *H01F 41/026* (2013.01)

(58) Field of Classification Search
  CPC . C23C 8/12; C23C 8/16; H01F 1/0577; H01F 1/026
  See application file for complete search history.

(56) References Cited

U.S. PATENT DOCUMENTS

2010/0252145 A1  10/2010  Fujihara et al.

FOREIGN PATENT DOCUMENTS

| CN | 1373894 A | 10/2002 |
|---|---|---|
| CN | 1938795 A | 3/2007 |

(Continued)

OTHER PUBLICATIONS

China National Intellectual Property Administration (CNIPA) Office Action 1 for 202011525256.6 Feb. 2, 2021 12 Pages (including translation).

(Continued)

*Primary Examiner* — Tima M. McGuthry-Banks
(74) *Attorney, Agent, or Firm* — ANOVA LAW GROUP, PLLC

(57) ABSTRACT

An anti-corrosion treatment method for preparing sintered NdFeB magnet includes preparing a sintered NdFeB matrix, and applying a heat treatment to the sintered NdFeB matrix in an oxidizing atmosphere containing at least one of alcohol or organic acid. A ratio of oxygen partial pressure to water vapor partial pressure in the oxidizing atmosphere is in a range from 1:1 to 300:1. A temperature for the heat treatment is equal to or lower than 300° C. A time for the heat treatment is in a range from 10 minutes to 200 minutes.

8 Claims, 1 Drawing Sheet

(56) References Cited

FOREIGN PATENT DOCUMENTS

| | | | |
|---|---|---|---|
| CN | 101809690 A | 8/2010 | |
| CN | 103804982 A | 5/2014 | |
| CN | 104008844 A | 8/2014 | |
| CN | 111739705 A | 10/2020 | |
| CN | 112259359 A | 1/2021 | |
| EP | 2197007 A1 * | 6/2010 | .............. C23C 8/16 |
| JP | H0232511 A | 2/1990 | |
| JP | 2000232026 A | 8/2000 | |
| JP | 2001143949 A | 5/2001 | |
| JP | 2006049801 A | 2/2006 | |
| JP | 2012204486 A | 10/2012 | |
| JP | 2012204581 A | 10/2012 | |

OTHER PUBLICATIONS

The Japan Patent Office (JPO) Notification of Reasons for Refusal for Application No. 2023-504003 and Translation Mar. 5, 2024 10 Pages.
German Patent and Trademark Office (DPMA) The Office Action for German Application No. 11 2021 002 982.7, Apr. 11, 2025 6 Pages.
World Intellectual Property Organization (WIPO) International Search Report for PCT/CN2021/117726 Dec. 13, 2021 5 pages (including translation).
German Patent and Trademark Office (DPMA) Examination request, for German Application No. 11 2021 002 982.7, Dec. 17, 2024 9 Pages(including English translation).

* cited by examiner

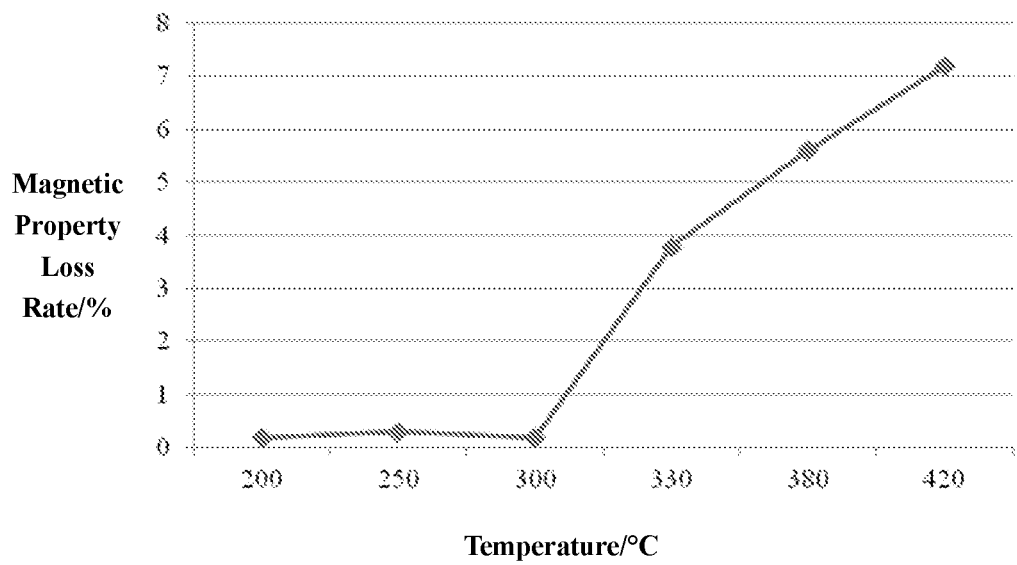

NEODYMIUM-IRON-BORON SINTERED MAGNET AND METHOD OF ANTI-CORROSION TREATMENT

CROSS-REFERENCE TO RELATED APPLICATION

This application is a continuation of International Application No. PCT/CN2021/117726, filed Sep. 10, 2021, which claims priority to Chinse Application No. 202011525256.6, filed Dec. 22, 2020, the entire contents of both of which are incorporated herein by reference.

TECHNICAL FIELD

The present disclosure relates to high corrosion resistant sintered NdFeB magnets and thereof.

BACKGROUND

In recent years, the development of sintered neodymium iron boron (NdFeB) magnets has been very rapid. The material is mainly prepared by powder metallurgy process from elements such as rare earth metal neodymium Nd, iron Fe and boron B. Due to the availability of abundant and cheap raw materials and high magnetic properties, the material has been widely used in many fields such as machinery, medical treatment, and automobiles. However, since the magnet contains the active rare earth element Nd, the corrosion resistance is very poor, and it is very easy to rust and corrode in a humid and hot environment, thereby causing the magnetic performance to be degraded or damaged. The corrosion resistance of magnets restricts the application of NdFeB magnets.

For NdFeB magnets used in drive motors of hybrid vehicles or electric vehicles, or IPM (internal permanent magnet) motors installed in inverter air conditioner compressors, etc., since the magnets are sealed in the motor by organic binders such as resin after installation, it is not easy to corrode, thereby only the anti-corrosion performance of magnets exposed to air conditions during storage, transportation, etc. is needed. Therefore, it is only needed to form a simple corrosion-resistant layer on the surface of the magnet.

Chinese patent application CN101809690A discloses applying a heat treatment to a rare earth metal-based sintered magnet with a thickness of 6 mm in the temperature range from 350° C. to 450° C., by controlling the heating rate to be in a range of from 100° C./hour to 1800° C./hour, and in an atmosphere with oxygen partial pressure in a range of from $1 \times 10^2$ Pa to $1 \times 10^5$ Pa and partial pressure of water vapor lower than 1000 Pa. The surface modification of the NdFeB magnet is achieved by oxidative heat treatment and a good surface anti-oxidation modified film is obtained, so as to achieve the purpose of corrosion resistance on the surface of the magnet. However, for the batch production of thin magnets production with a thickness of less than 2 mm, due to high heat treatment temperature, when the cooling rate is fast, it is easy to cause cracks on the surface of the magnet and affect the qualification rate. On the other hand, when cooling rate is slow, a long time to cool down to room temperature is necessary which affect production efficiency.

SUMMARY

To solve one of the above problems, the present disclosure provides an anti-corrosion treatment method for preparing sintered NdFeB magnet, which comprises:

preparing a sintered NdFeB matrix and applying a heat treatment to the sintered NdFeB matrix in an oxidizing atmosphere containing alcohol and/or organic acid;

wherein, the ratio of oxygen partial pressure to water vapor partial pressure in the oxidizing atmosphere containing alcohol and/or organic acid is in a range from 1:1 to 300:1; the heat treatment temperature is equal to or lower than 300° C., and the heat treatment time is in a range from 10 minutes to 200 minutes.

In some embodiments of the present disclosure, the heat treatment of the sintered NdFeB matrix in an oxidizing atmosphere containing alcohol and/or organic acid comprises placing the sintered NdFeB matrix whose surface is coated with an aqueous solution containing alcohol and/or organic acid in an atmosphere with an oxygen partial pressure in a range from $5 \times 10^2$ Pa to $1 \times 10^4$ Pa and a water vapor partial pressure in a range from 50 Pa to 150 Pa for heat treatment.

In some embodiments of the present disclosure, the heat treatment of the sintered NdFeB matrix in an oxidizing atmosphere containing alcohol and/or organic acid comprises placing the sintered NdFeB matrix in an atmosphere with an oxygen partial pressure in a range from $5 \times 10^2$ Pa to $1 \times 10^4$ Pa and the partial pressure of water vapor containing alcohol and/or organic acid in a range from 50 Pa to 150 Pa for heat treatment.

In some embodiments of the present disclosure, the total content of alcohol and/or organic acid in the aqueous solution accounts for 0.1 wt % to 10 wt %.

In some embodiments of the present disclosure, the total content of alcohol and/or organic acid in water vapor accounts for 0.1 wt % to 10 wt %.

In some embodiments of the present disclosure, the sintered NdFeB matrix is immersed in the aqueous solution containing alcohol and/or organic acid for a period of time of 30 seconds to 10 minutes, so that the surface of the NdFeB matrix is coated with the aqueous solution containing alcohol and/or organic acid, wherein the total content of alcohol and/or organic acid in the aqueous solution accounts for 0.1 wt % to 5 wt %.

In some embodiments of the present disclosure, the alcohol is one or more selected from methanol, ethanol, 1-propanol, 2-methyl-1-propanol, 2-methyl-2-propanol, 1-butanol, 2-butanol n-pentanol, 2-ethoxyethanol, 2-(2-butoxyethoxy)ethanol;

the organic acid is one or more selected from formic acid, acetic acid, propionic acid, oxalic acid, malonic acid, butyric acid and maleic acid.

In some embodiments of the present disclosure, the ratio of the alcohol to the organic acid is in a range from 1:2 to 1:5.

In the present disclosure, the heat treatment temperature is in a range from 200° C. to 300° C., and the time is in a range from 15 minutes to 200 minutes.

Further, the present disclosure also provides the sintered NdFeB magnet including a corrosion-resistant film layer with a thickness ranging from 0.2 µm to 3 µm and the corrosion-resistant film layer is obtained by the above-mentioned anti-corrosion treatment method.

By adding alcohol and/or organic acid in the oxidizing atmosphere in the present disclosure, the heat treatment is conducted in a specific temperature equal to or lower than 300° C., without controlling the heating rate of heat treatment, which not only can prevent a decrease of the magnetic properties of sintered NdFeB magnets, but also can improve the corrosion resistance of the magnet surface, while reducing the generation of surface cracks of the NdFeB magnet.

In addition, due to the low heat treatment temperature, the generation of surface cracks of the NdFeB magnet during the cooling process is avoided, and the yield of the NdFeB magnet is improved.

Moreover, the method of the present disclosure is applicable to the NdFeB matrices with any oxygen content and specifications. The method can conduct an oxidative heat treatment to sintered NdFeB matrix at a temperature equal or below 300° C. (heat treatment of sintered NdFeB matrix is conducted in an oxidative environment) to form a corrosion-resistant film.

Additional aspects and advantages of the present disclosure will be set forth, in part, from the following description, and in part will be apparent from the following description, or may be learned by practicing of the disclosure.

BRIEF DESCRIPTION OF THE DRAWING

FIG. 1 is a schematic diagram showing the relationship between the magnetic property loss rate and the heat treatment temperature in an embodiment of the present disclosure.

DETAILED DESCRIPTION OF EMBODIMENTS

The embodiments of the present disclosure will be described in more detail in conjunction with the accompanying drawings and examples in order to provide a better understanding of the embodiments of the disclosure and its advantages. However, the specific embodiments and examples described below are illustrative only rather than limiting the disclosure.

It should be particularly pointed out that all similar substitutions and modifications are obvious to those skilled in the art, and they are deemed to be included in the present disclosure. The method and application of the present disclosure have been described through some embodiments, and persons of ordinary skill in the art can make changes or appropriate changes and combinations of the methods and applications described herein without departing from the content, spirit and scope of the present disclosure to achieve and apply the technology of the present disclosure.

In the following, for brevity, "sintered NdFeB magnet" is sometimes referred to simply as "magnet".

This disclosure provides an anti-corrosion treatment method for preparing sintered NdFeB magnet comprising
preparing a sintered NdFeB matrix and applying a heat treatment to the sintered NdFeB matrix in an oxidizing atmosphere containing alcohol and/or organic acid;
wherein, the ratio of oxygen partial pressure to water vapor partial pressure in the oxidizing atmosphere containing alcohol and/or organic acid is in a range from 1:1 to 300:1; the heat treatment temperature is equal to or lower than 300° C., and the heat treatment time is in a range from 10 to 200 minutes.

By adding alcohol and/or organic acid in the oxidizing atmosphere in the present disclosure, the heat treatment is conducted in a specific temperature equal to or lower than 300° C., without controlling the heating rate of heat treatment, which not only can prevent a decrease of the magnetic properties of sintered NdFeB magnets, but also can improve the corrosion resistance of the magnet surface, while reducing the generation of surface cracks of the NdFeB magnet.

Moreover, the method in the present disclosure is applicable to the NdFeB matrices with any oxygen content and specifications. The method can conduct an oxidative heat treatment to sintered NdFeB matrix at a temperature equal or below 300° C. to form a corrosion-resistant film.

It should be noted that the heat treatment described in the present disclosure includes a heating process before the heat treatment, the heat treatment process, and a cooling process after the heat treatment.

In the present disclosure, whether it is the heating process, the heat treatment process, or the cooling process, it is all carried out in an oxidizing atmosphere. This not only can prevent the deterioration of stability of the corrosion-resistant film formed on the surface of the matrix caused by changes in the moisture content in the atmosphere, but also can prevent the deterioration of the magnetic characteristics caused by dew condensation at the surface of the matrix.

In the present disclosure, the heat treatment of the sintered NdFeB matrix in an oxidizing atmosphere containing alcohol and/or organic acid comprises
placing the sintered NdFeB matrix whose surface is coated with an aqueous solution containing alcohol and/or organic acid in an atmosphere with an oxygen partial pressure in a range from $5\times10^2$ Pa to $1\times10^4$ Pa and a water vapor partial pressure in a range from 50 Pa to 150 Pa,
or placing the sintered NdFeB matrix in an atmosphere with an oxygen partial pressure in a range from $5\times10^2$ Pa to $1\times10^4$ Pa and the partial pressure of water vapor containing alcohol and/or organic acid in a range from 50 Pa to 150 Pa.

By applying an aqueous solution containing alcohol and/or organic acid on the matrix surface or placing the matrix in an environment of water vapor containing alcohol and/or organic acid, the matrix is finally placed in an oxidizing atmosphere containing alcohol and/or organic acid. The above-mentioned oxidizing atmosphere is favorable for forming a desired anti-corrosion film on the surface of the matrix at a relatively low heat treatment temperature. The reason for the formation is presumed as follows: a dense iron oxide layer is formed on the surface of the matrix, and its main component is expected to be $Fe_2O_3$ (hematite). In conventional processes, a certain high temperature is required to form the above oxides. By placing the matrix in an oxidizing atmosphere containing an organic acid, the organic acid will initially oxidize the iron in the matrix at a lower temperature and then the oxygen and/or water vapor in the oxidizing atmosphere will promote its further oxidation reaction. These can increase the $Fe_2O_3$ generation efficiency and accelerate the surface oxidation process of the matrix. In addition, if alcohol is contained in the oxidizing atmosphere, hydrogen may be generated during the oxidative heat treatment of iron in the magnet. The addition of alcohol can improve the solubility of hydrogen, which is beneficial to accelerate the oxidation reaction of iron in the matrix. Therefore, the oxidizing atmosphere containing alcohol and/or organic acid can accelerate the further oxidation of the surface of the magnet by oxygen and water vapor, thereby reducing the demand for energy provided by the heat treatment process for magnet oxidation.

If the partial pressure of oxygen is lower than $5\times10^2$ Pa, it will make the oxygen content in the oxidizing atmosphere too low, so that the time for the formation of the corrosion-resistant film on the surface of the matrix is too long, or the formed corrosion-resistant film cannot achieve sufficient corrosion resistance and stability. If the partial pressure of oxygen is higher than $1\times10^4$ Pa, the corrosion resistance of the magnet may not be greatly improved, and the production cost may also be increased.

When the partial pressure of water vapor is lower than 150 Pa, on the one hand, it can restrain a large amount of hydrogen by-products generated by matrix from reacting in an oxidizing atmosphere with high water vapor pressure, thereby restraining the magnet from embrittlement due to adsorption of the generated hydrogen and reduction of the magnetic properties. On the other hand, it may reduce the amount of magnetite ($Fe_3O_4$) in iron oxide, thereby increasing the hematite ($Fe_2O_3$) proportion.

In some embodiments, the aqueous solution containing alcohol and/or organic acid can be applied to the surface of the sintered NdFeB matrix by immersing, spraying or brushing.

The present disclosure in some embodiments adopts the immersing method to apply the aqueous solution containing alcohol and/or organic acid to the surface of the sintered NdFeB matrix. Specifically, the sintered NdFeB matrix can be immersed in an aqueous solution containing alcohol and/or organic acid, so that the surface of the sintered NdFeB matrix can be coated with the aqueous solution containing alcohol and/or organic acid.

In the present disclosure, the above-mentioned aqueous solution containing alcohol and/or organic acid in some embodiments contains 0.1 wt % to 10 wt % of alcohol and/or organic acid. The above-mentioned aqueous solution containing alcohol and/or organic acid in some embodiments contains 0.1 wt % to 5 wt % of alcohol and/or organic acid, and the immersing time may be in a range from 30 seconds to 10 minutes.

The above-mentioned alcohol and/or organic acid-containing water vapor in some embodiments contains 0.1 wt % to 10 wt %. of alcohol and/or organic acid.

The alcohol used in the present disclosure may be one or more selected from methanol, ethanol, 1-propanol, 2-methyl-1-propanol, 2-methyl-2-propanol, 1-butanol, 2-butanol, n-pentanol, 2-ethoxyethanol, 2-(2-butoxyethoxy) ethanol. Certainly, other alcohols with similar properties also can be used.

The organic acid used in the present disclosure is a fatty acid, which can be compatible or miscible with water (the solubility is greater than 60 g/100 g water), and the acidity coefficient PKa value is less than 5 (the smaller the PKa value, the stronger the dissociation ability and the stronger the acidity at the same concentration). In some embodiments, the organic acid includes one or more of formic acid, acetic acid, propionic acid, oxalic acid, malonic acid, butyric acid and maleic acid. Other acids with similar properties can also be used. The dosage ratio of alcohol to organic acid is in some embodiments in a range from 1:2 to 1:5. The combined action of alcohol and organic acid is conducive to the full reaction of the oxidation reaction at lower temperature.

In the present disclosure, the heat treatment temperature in some embodiments is in a range from 200° C. to 300° C. When the temperature is lower than 200° C., it is difficult to form a corrosion-resistant film on the surface of the matrix, or the formed film may be too thin to achieve the purpose of anti-corrosion. When the temperature is higher than 300° C., excessive oxidation of the surface of the matrix may be caused, and a large amount of hydrogen will be generated along with it, which will adversely affect the magnetic properties of the magnet.

The heat treatment time in present disclosure may be in a range from 10 minutes to 200 minutes, in some embodiments from 15 minutes to 200 minutes. If the time is too short, it may be difficult to form the desired corrosion-resistant film on the surface of the matrix. If the time is too long, it will only consume energy and increase production costs.

Further, the present disclosure also provides a sintered NdFeB magnet with good corrosion resistance. It includes a corrosion-resistant film layer with a thickness in a range from 0.2 μm to 3 μm. The corrosion-resistant film layer is obtained by the above-mentioned anti-corrosion treatment method. If the thickness of the corrosion-resistant film is too thin, it may not be able to exert sufficient corrosion resistance. If it is too thick, it will be difficult to obtain, and the production cost will also be increased.

The present disclosure will now be described by way of embodiments with reference to the accompanying drawings. The numerical values of the process conditions taken in the following examples are all exemplary, and the possible numerical ranges thereof are as shown in the foregoing summary of the disclosure.

In the following example the oxygen content of sintered NdFeB matrix is tested with nitrogen and oxygen analyzer, and the equipment is Model ON-330, by Chongqing Yanrui Instrument Co., Ltd.

The method for evaluating the magnetic characteristics of the magnet is as follows: first, the magnet is saturation magnetized by a magnetizer, and then placed in a Helmholtz coil to measure its magnetic flux value in turn:

Magnetic flux loss rate (%)=((A−B)/A)×100, where A is the magnetic flux value of the matrix without oxidative heat treatment, and B is the magnetic flux value of the magnet after oxidative heat treatment.

Magnet corrosion resistance evaluation: under the conditions of high temperature and high humidity with test temperature 120° C., relative humidity 100%, pressure 2 atm, test time 96 hours, the magnet is weighed before the test and weighed after removing the magnetic powder from the surface of the magnet after the test.

Statistics of cracks on the surface of magnets: After 50 matrices were placed in an oxidizing atmosphere for heat treatment, the number of obtained magnets with cracks on the surface was counted.

Preparation of Sintered Sample Matrix
Preparation Sintered Sample Matrix 1

The alloy ingots with the composition of $Nd_{31}Dy_{0.5}Co_{1.0}Cu_{0.25}Al_{0.5}B_{0.98}Fe_{bal}$ (weight percent) was prepared by a melting method. The alloy was coarsely pulverized, hydrogen ground, and further ground by a jet mill to obtain a fine powder having a D50 grain size of 4.5 μm. The fine powder was compacted in an aligning magnetic field using a press machine to obtain green compact. The aligning magnetic field to be applied have a strength of 1.5 tesla (T). Then, the green compact was taken out from the press machine, placed in a vacuum sintering furnace, sintered at 1070° C. for 3 hours, and tempered at 600° C. for 4 hours to obtain a blank magnet. The blank magnet was machined to obtain a sintered matrix with a thickness of 0.5 mm, a length of 5 mm and a width of 5 mm (hereinafter referred to as "sintered sample matrix 1"). The oxygen content of the sintered sample matrix 1 was 0.08 wt % measured by a nitrogen-oxygen analyzer.

The corrosion resistance properties of the sintered sample matrix 1 was tested which can be seen in Table 2 for details.

Preparation Sintered Sample Matrix 2

A blank magnet with the composition of $Nd_{18.5}Dy_{11.7}Co_{0.9}Cu_{0.32}Al_{0.9}B_{0.95}Fe_{bal}$ (weight percent) was obtained by the same preparation method as the sintered sample matrix 1. A sintered sample matrix 2 with a thickness of 5 mm, a length of 7 mm and a width of 7 mm was obtained after machining. The oxygen content of the sintered sample matrix 2 was 0.1 wt % measured by a nitrogen-oxygen analyzer.

Preparation Sintered Sample Matrix 3

A blank magnet with the composition of $Nd_{18.5}Dy_{11.7}Co_{0.9}Cu_{0.32}Al_{0.9}B_{0.95}Fe_{bal}$ (weight percent) was obtained by the same preparation method as the sintered sample matrix 1. A sintered sample matrix 3 with a thickness of 8 mm, a length of 7 mm and a width of 7 mm was obtained after machining. The oxygen content of the sintered sample matrix 3 was 0.2 wt % measured by a nitrogen-oxygen analyzer.

Anti-Corrosion Treatment

Embodiment 1

The sintered sample matrix 1 was immersed in an aqueous solution containing ethanol and acetic acid, wherein the mass ratio of ethanol to acetic acid was 1:1, the total content of ethanol and acetic acid in the aqueous solution was 0.1 wt %, and the ratio of ethanol to acetic acid was 1:3. After immersing for 5 minutes, it was taken out and placed in an atmosphere with an oxygen partial pressure of $5 \times 10^2$ Pa and a water vapor partial pressure of 25 Pa, the heat treatment was carried out at a temperature of 200° C. for 60 minutes. Next, it was subjected to a cooling process in the same atmosphere to obtain the sintered magnet.

After the heat treatment was completed, the thickness of the surface corrosion-resistant film, the corrosion resistance of the sintered magnet, and the number of surface cracks were measured, as shown in Table 1, Table 2, and Table 3 for details.

Embodiment 2

The sintered sample matrix 1 was subjected to oxidation heat treatment by the same method as in embodiment 1. Different from Embodiment 1, the aqueous solution was an aqueous solution containing ethanol and propionic acid, wherein the mass ratio of ethanol to propionic acid was 1:2 and the total content of ethanol and acetic acid in the aqueous solution was 1.0 wt %.

After the heat treatment was completed, the thickness of the surface corrosion-resistant film layer and the corrosion resistance properties of the sintered magnet were measured, as shown in Table 1 and Table 2 for details.

Embodiment 3

The sintered sample matrix 1 was subjected to oxidation heat treatment by the same method as in embodiment 1. Different from embodiment 1, the total content of ethanol and acetic acid in the aqueous solution was 3.0 wt %.

After the treatment was completed, the loss rate of the magnetic properties, the thickness of the surface corrosion-resistant film and the corrosion resistance properties of the magnet were measured, as shown in FIG. 1, Table 1, Table 2 for details.

Embodiment 4

The sintered sample matrix 1 was directly placed in an atmosphere with an oxygen partial pressure of $5 \times 10^2$ Pa and a water vapor partial pressure of 25 Pa, wherein the total content of ethanol and acetic acid in water vapor was 3.0 wt % and the mass ratio of ethanol to acetic acid was 1:3. The heat treatment was carried out at a temperature of 250° C. for 60 minutes. Next, it was subjected to a cooling process in the same atmosphere.

After the heat treatment was completed, the loss rate of the magnetic properties of the sintered magnet, the thickness of the surface corrosion-resistant film and the corrosion resistance properties of the sintered magnet were measured, as shown in FIG. 1, Table 1, Table 2 for details.

Embodiment 5

The sintered sample matrix 1 was subjected to oxidation heat treatment by the same method as in embodiment 4. Different from embodiment 4, the heat treatment was carried out at a temperature of 300° C.

After the heat treatment was completed, the loss rate of the magnetic properties of the sintered magnet, the thickness of the surface corrosion-resistant film and the corrosion resistance properties of the sintered magnet were measured, as shown in FIG. 1, Table 1, Table 2 for details.

Embodiment 6

The sintered sample matrix 1 was subjected to oxidation heat treatment by the same method as in embodiment 5. Different from embodiment 5, the total content of ethanol and acetic acid in water vapor was 5.0 wt % and the mass ratio of ethanol to acetic acid was 1:4.

After the treatment was completed, the thickness of the surface corrosion-resistant film, the corrosion resistance of the sintered magnet, and the number of surface cracks were measured, as shown in Table 1, Table 2, and Table 3 for details.

Embodiment 7

An aqueous solution containing 2-methyl-1-propanol was brushed on the surface of the sintered sample matrix 2, wherein the content of 2-methyl-1-propanol was 2.0 wt %. After the brushing process, the sintered sample matrix 2 was placed for 15 minutes, subsequently the matrix was placed in an atmosphere with an oxygen partial pressure of $5 \times 10^3$ Pa and water vapor partial pressure of 100 Pa (the ratio of oxygen partial pressure/water vapor partial pressure is 50) for 15 minutes, the heat treatment was carried out at a temperature of 300° C. Next, it was subjected to a cooling process in the same atmosphere to obtain the sintered magnet.

After the heat treatment was completed, the thickness of the surface corrosion-resistant film layer and the corrosion resistance properties of the sintered magnet were measured, as shown in Table 1 and Table 2 for details.

Embodiment 8

The sintered sample matrix 2 was immersed in an aqueous solution containing 2-ethoxyethanol, wherein the content of 2-ethoxyethanol was 2.5 wt %. After immersing for 30 seconds, the sintered sample matrix 2 was placed in an atmosphere with an oxygen partial pressure of $1 \times 10^4$ Pa and water vapor partial pressure of 100 Pa (the ratio of oxygen partial pressure/water vapor partial pressure is 100), the heat treatment was carried out at a temperature of 250° C. for 100 minutes. Next, it was subjected to a cooling process in the same atmosphere to obtain the sintered magnet.

After the heat treatment was completed, the thickness of the surface corrosion-resistant film layer and the corrosion resistance properties of the sintered magnet were measured, as shown in Table 1 and Table 2 for details.

Embodiment 9

The sintered sample matrix 3 was immersed in an aqueous solution containing malonic acid, wherein the content of malonic acid was 2.5 wt %. After immersing for 50 minutes, the sintered sample matrix 3 was placed in an atmosphere with an oxygen partial pressure of $1 \times 10^4$ Pa and water vapor partial pressure of 50 Pa (the ratio of oxygen partial pressure/water vapor partial pressure is 200), the heat treatment was carried out at a temperature of 250° C. for 100 minutes. Next, it was subjected to a cooling process in the same atmosphere.

After the heat treatment was completed, the thickness of the surface corrosion-resistant film layer and the corrosion resistance properties of the sintered magnet were measured, as shown in Table 1 and Table 2 for details.

Embodiment 10

The sintered sample matrix 3 was immersed in an aqueous solution containing 2-(2-butoxyethoxy)ethanol and maleic acid, wherein the total content of the 2-(2-butoxyethoxy)ethanol and maleic acid content was 5.0 wt % and the mass ratio of 2-(2-butoxyethoxy)ethanol to maleic acid was 1:5. After immersing for 80 minutes, the sintered sample matrix 3 was placed in an atmosphere with an oxygen partial pressure of $9 \times 10^3$ Pa and water vapor partial pressure of 150 Pa (the ratio of oxygen partial pressure/water vapor partial pressure is 60), the heat treatment was carried out at a temperature of 200° C. for 200 minutes. Next, it was subjected to a cooling process in the same atmosphere to obtain the sintered magnet.

After the heat treatment was completed, the thickness of the surface corrosion-resistant film layer and the corrosion resistance properties of the sintered magnet were measured, as shown in Table 1 and Table 2 for details.

Embodiment 11

The sintered sample matrix 3 was subjected to oxidation heat treatment by the same method as in embodiment 10. Different from embodiment 10, the mass ratio of 2-(2-butoxyethoxy)ethanol to maleic acid was 2:1.

After the heat treatment was completed, the thickness of the surface corrosion-resistant film layer and the corrosion resistance properties of the sintered magnet were measured, as shown in Table 1 and Table 2 for details.

Comparative Example 1

The sintered sample matrix 1 was placed in an atmosphere with an oxygen partial pressure of $1 \times 10^4$ Pa and water vapor partial pressure of 100 Pa (the ratio of oxygen partial pressure/water vapor partial pressure is 100), the heat treatment was carried out at a temperature of 300° C. for 200 minutes. Next, it was subjected to a cooling process in the same oxidizing atmosphere to obtain the sintered magnet.

After the heat treatment was completed, the corrosion resistance properties of the sintered magnet were measured, as shown in Table 2.

Comparative Example 2

The sintered sample matrix 1 was immersed in an aqueous solution containing ethanol and acetic acid, wherein the mass ratio of ethanol to acetic acid was 1:1 and the total content of ethanol and acetic acid was 5.0 wt %. After immersing for 60 minutes, the sintered sample matrix 1 was taken out without oxidation heat treatment.

After the immering process was completed, the corrosion resistance properties of the sintered matrix 1 were measured, as shown in Table 2.

Comparative Example 3

The sintered sample matrix 1 was immersed in an aqueous solution containing ethanol and acetic acid, wherein the mass ratio of ethanol to acetic acid was 1:1 and the total content of ethanol and acetic acid was 5.0 wt %. After immersing for 5 minutes, the sintered sample matrix 1 was taken out and placed in an atmosphere with an oxygen partial pressure of $1 \times 10^4$ Pa and a water vapor partial pressure of 50 Pa (the ratio of oxygen partial pressure/water vapor partial pressure is 200), the heat treatment was carried out at a temperature of 150° C. for 200 minutes. Next, it was subjected to a cooling process in the same atmosphere to obtain the sintered magnet.

After the heat treatment was completed, the corrosion resistance properties of the sintered magnet were measured, as shown in Table 2.

Comparative Example 4

The sintered sample matrix 1 was subjected to oxidation heat treatment by the same method as in embodiment 3. Different from embodiment 1, the heat treatment was carried out at a temperature of 330° C.

After the heat treatment was completed, the thickness of the corrosion-resistant film on the surface of the sintered magnet and the loss rate of the magnetic properties of the sintered magnet were measured, as shown in Table 1 and FIG. 1 for details.

Comparative Example 5

The sintered sample matrix 1 was subjected to oxidation heat treatment by the same method as in embodiment 3. Different from embodiment 1, the heat treatment was carried out at a temperature of 380° C.

After the heat treatment was completed, the thickness of the corrosion-resistant film on the surface of the sintered magnet and the loss rate of the magnetic properties of the sintered magnet were measured, as shown in Table 1 and FIG. 1 for details.

Comparative Example 6

The sintered sample matrix 1 was subjected to oxidation heat treatment by the same method as in embodiment 3. Different from embodiment 1, the heat treatment was carried out at a temperature of 420° C.

After the heat treatment was completed, the thickness of the corrosion-resistant film on the surface of the sintered magnet and the loss rate of the magnetic properties of the sintered magnet were measured, as shown in Table 1 and FIG. 1 for details.

Comparative Example 7

The sintered sample matrix 1 was placed in an atmosphere with an oxygen partial pressure of $1 \times 10^4$ Pa and a water vapor partial pressure of 100 Pa (the ratio of oxygen partial pressure/water vapor partial pressure is 100), the heat treatment was carried out at a temperature of 400° C. for 200 minutes. Next, it was subjected to a cooling process in the same atmosphere to obtain the sintered magnet.

After the treatment, the number of cracks on the surface of the sintered magnet was measured, as shown in Table 3.

TABLE 1

|  | (Corrosion Resistance) μm |
| --- | --- |
| Embodiment 1 | 1.0 |
| Embodiment 2 | 1.2 |
| Embodiment 3 | 1.8 |
| Embodiment 4 | 2.3 |
| Embodiment 5 | 2.8 |
| Embodiment 6 | 4 |
| Embodiment 7 | 0.5 |
| Embodiment 8 | 0.8 |
| Embodiment 9 | 1.0 |
| Embodiment 10 | 3 |
| Embodiment 11 | 1.5 |
| Comparative Example 4 | 3.2 |
| Comparative Example 5 | 3.8 |
| Comparative Example 6 | 4.3 |

As can be seen from Table 1, the method of the present disclosure can obtain a corrosion-resistant film layer. Moreover, comparing Embodiment 3 to 5 with Comparative Examples 4 to 6, it can be seen that as the temperature increases, the thickness of the film increases. In addition, it was found that the thickness of the corrosion-resistant film obtained by adding alcohol and acid treatment in an oxidative atmosphere was larger than that obtained by adding alcohol or acid treatment alone, and the thickness of the corrosion-resistant film was thicker by adding more organic acid than more alcohol in an oxidizing atmosphere under the same conditions.

It can be seen from Table 2 that the weight loss of the magnets with the corrosion-resistant film layer on the surface obtained by the method of the present disclosure in Embodiment 1 to 11 was much lower than that of Comparative Examples 1 to 3 and the sample matrix 1. The corrosion-resistant film layer on the surface obtained by the method of the present disclosure in Embodiment 1 to 11 can be seen with the better corrosion resistance properties.

TABLE 3

|  | Number of magnets with surface cracks per 50 magnets |
| --- | --- |
| Embodiment 1 | 0 |
| Embodiment e 6 | 0 |
| Comparative Example 7 | 11 |

It can be seen from Table 3 that the number of surface cracks on the sintered magnet can be significantly reduced by the preparing method of the present disclosure.

FIG. 1 shows the magnetic property loss rates of the sintered magnets of Embodiments 3 to 5 and Comparative Examples 4 to 6.

It can be seen from FIG. 1 that the loss rate of the magnetic properties of the magnet obtained after heat treatment was very low while the temperature of the oxidation heat treatment was between 200° C. and 300° C. It can be considered that the oxidation heat treatment in this temperature range will not affect the magnetic properties of the magnet. However, while the heat temperature was over 300° C., the magnetic properties of the magnet decreased significantly with the increase of the heat treatment temperature.

It should be noted that the above-described embodiments are merely illustrative of the disclosure and are not intended to limit the embodiments. Other variations or modifications

TABLE 2

|  | Alcohol and/or organic acid/wt % | Heat Treatment Temperature | Partial pressure of oxygen (Pa) 2: | Water vapor partial pressure/Pa | Weight loss/(mg/cm$^2$) |
| --- | --- | --- | --- | --- | --- |
| Embodiment 1 | Alcohol + organic acid 0.1 | 200 | 5-2: | 25 | 0.33 |
| Embodiment 2 | Alcohol + Organic Acid 1.0 | 200 | 5-2: | 25 | 0.28 |
| Embodiment 3 | Alcohol + Organic Acid 3.0 | 200 | 5-2: | 25 | 0.21 |
| Embodiment 4 | Alcohol + Organic Acid 3.0 | 250 | 5-2: | 25 | 0.16 |
| Embodiment 5 | Alcohol + Organic Acid 3.0 | 300 | 5-2: | 25 | 0.17 |
| Embodiment 6 | Alcohol + Organic Acid 5.0 | 300 | 5-2: | 25 | 0.18 |
| Embodiment 7 | Alcohol 2.0 | 300 | 5-3: | 100 | 0.24 |
| Embodiment 8 | Alcohol 2.5 | 250 | 1-4: | 100 | 0.25 |
| Embodiment 9 | Organic acids 2.5 | 250 | 1-4: | 50 | 0.21 |
| Embodiment 10 | Alcohol + Organic Acid 5.0 | 200 | 9-3: | 150 | 0.2 |
| Embodiment 11 | Alcohol + Organic Acid 5.0 | 200 | 9-3: | 150 | 0.23 |
| Sample matrix 1 | 0 | — | — | — | 1.28 |
| Comparative Example 1 | 0 | 300 | 1-4: | 100 | 1.13 |
| Comparative Example 2 | Alcohol + Organic Acid 5.0 | 0 | 0 | 0 | 0.85 |
| Comparative Example 3 | Alcohol + Organic Acid 5.0 | 150 | 1-4: | 50 | 0.68 | may be made by those skilled in the art in light of the above description. There is no need and no way to exhaust all of the implementations. Obvious changes or variations resulting therefrom are still within the scope of the disclosure.

The invention claimed is:

1. An anti-corrosion treatment method for preparing a sintered NdFeB magnet comprising:
    preparing a sintered NdFeB matrix;
    immersing the sintered NdFeB matrix in an aqueous solution containing at least one of an alcohol or an organic acid to coat a surface of the NdFeB matrix with the aqueous solution; and
    applying a heat treatment to the coated NdFeB matrix in an oxidizing atmosphere;
    wherein:
    a ratio of oxygen partial pressure to water vapor partial pressure in the oxidizing atmosphere is in a range from 1:1 to 300:1;
    a temperature for the heat treatment is equal to or lower than 300°C; and
    a time for the heat treatment is in a range from 10 minutes to 200 minutes.

2. The anti-corrosion treatment method according to claim 1, wherein:
    a content of the at least one of the alcohol or the organic acid in the aqueous solution is 0.1 wt% to 10 wt% of a total weight of the aqueous solution; and
    immersing is for a period of time of 30 seconds to 10 minutes.

3. The anti-corrosion treatment method according to claim 1, wherein:
    a content of the at least one of the alcohol or the organic acid in the aqueous solution is 0.1 wt% to 5 wt% of a total weight of the aqueous solution.

4. The anti-corrosion treatment method according to claim 1, wherein:
    the alcohol includes at least one of methanol, ethanol, 1-propanol, 2-methyl-1-propanol, 2-methyl-2-propanol, 1-butanol, 2-butanol, n-pentanol, 2-ethoxyethanol, or 2-(2-butoxyethoxy) ethanol; and
    the organic acid includes at least one of formic acid, acetic acid, propionic acid, oxalic acid, malonic acid, butyric acid, or maleic acid.

5. The anti-corrosion treatment method according to claim 1, wherein:
    the at least one of the alcohol or the organic acid includes the alcohol and the organic acid; and
    a ratio of the alcohol to the organic acid is in a range from 1:2 to 1:5.

6. The anti-corrosion treatment method according to claim 1, wherein:
    the temperature for the heat treatment is in a range from 200°C to 300°C, and the time for the heat treatment is in a range from 15 minutes to 200 minutes.

7. An anti-corrosion treatment method for preparing a sintered NdFeB magnet comprising:
    preparing a sintered NdFeB matrix;
    placing the sintered NdFeB matrix in an oxidizing atmosphere including water vapor that contains at least one of an alcohol or an organic acid; and
    applying a heat treatment to the NdFeB matrix in the oxidizing atmosphere;
    wherein:
    a ratio of oxygen partial pressure to water vapor partial pressure in the oxidizing atmosphere is in a range from 1:1 to 300:1;
    a temperature for the heat treatment is equal to or lower than 300°C; and
    a time for the heat treatment is in a range from 10 minutes to 200 minutes.

8. The anti-corrosion treatment method according to claim 7, wherein:
    applying the heat treatment to the NdFeB matrix in the oxidizing atmosphere is with the oxygen partial pressure in a range from $5 \times 10^2$ Pa to $1 \times 10^4$ Pa and the water vapor partial pressure in a range from 50 Pa to 150 Pa.

* * * * *